United States Patent
Schrattenecker

(12) 
(10) Patent No.: US 6,500,064 B1
(45) Date of Patent: Dec. 31, 2002

(54) CHAFF DISTRIBUTOR FOR A COMBINE HARVESTER

(76) Inventor: Franz Schrattenecker, Edenaichet 21, A-4773 Eggerding (AT)

( * ) Notice: Subject to any disclaimer, the term of this patent is extended or adjusted under 35 U.S.C. 154(b) by 0 days.

(21) Appl. No.: 09/314,836

(22) Filed: May 19, 1999

(30) Foreign Application Priority Data

May 19, 1998 (DE) .......................................... 198 22 499

(51) Int. Cl.[7] .......................... A01F 12/40; A01F 12/48
(52) U.S. Cl. ...................... 460/112; 460/901; 460/100
(58) Field of Search .............................. 460/8, 97, 99, 460/100, 101, 111, 112, 113, 901

(56) References Cited

U.S. PATENT DOCUMENTS

| 3,860,010 A | * | 1/1975 | Anderson et al. ........... 460/111 |
| 5,021,028 A | * | 6/1991 | Kersting et al. .............. 460/85 |
| 5,021,030 A | * | 6/1991 | Hatford et al. ............. 460/111 |
| 5,120,275 A | * | 6/1992 | Zacharias ................... 460/111 |
| 5,501,635 A | * | 3/1996 | Niermann ................... 460/112 |

FOREIGN PATENT DOCUMENTS

| DE | 3615151 | * | 9/1989 | ................. 460/112 |
| EP | 331784 | * | 9/1989 | ................. 460/112 |

* cited by examiner

Primary Examiner—Thomas B. Will
Assistant Examiner—Meredith C. Petravick
(74) Attorney, Agent, or Firm—Dilworth & Barrese LLP

(57) ABSTRACT

A chaff distributor for a combine harvester or similar for the distribution of chaff, the chaff distributor (6) possesses a trough (8) with a conveyor screw (9) supported drivably therein.

24 Claims, 4 Drawing Sheets

CHAFF DISTRIBUTOR FOR A COMBINE HARVESTER

BACKGROUND OF THE INVENTION

The invention relates to a chaff distributor for a combine harvester or similar for the distribution of chaff. The invention further relates to a combine harvester having such a chaff distributor.

In a combine harvester, there is usually a straw-walker under which a sieve shoe is located. The cleaning wind from the combine harvester blows the chaff falling through the cleaning shoe towards the back. The chaff coming from the cleaning system of the combine harvester is only insufficiently taken up by the chaff distributors known up to now. This applies in particular to heavy parts such as weed seeds and similar. In the known chaff distributors, these parts fall in an undistributed manner onto the bottom over the width of the cleaning system. Furthermore, in the known chaff distributors, the distribution width is very small and—relative to the combine harvester cutter bar width—in a very non-uniform manner.

SUMMARY OF THE INVENTION

It is the object of the invention to propose an enhanced chaff distributor for a combine harvester or similar.

This object is solved in accordance with the invention by a trough having a conveyor screw supported in a drivable manner therein. The trough is open to the top. It can be designed in the form of a barrel. It can be a semi-cylindrically shaped trough. The conveyor screw supported in a drivable manner therein has a clockwise and counter-clockwise motion and is driven in such a way that the chaff is transported outwards in each case. The conveyor screw accordingly has clockwise motion on one side and counter-clockwise motion on the other. It transports the chaff into the relevant external regions of the trough. The chaff distributor is preferably attached directly behind the cleaning system of the combine harvester.

Advantageous embodiments are described herein.

Preferably, a chaff separation plate pointing upwards is provided behind the chaff distributor or behind the trough. This chaff separation plate has an essentially vertical course. It extends preferably closely to the lower side of the sieve shoe or the rear end of the sieve shoe. The chaff separation plate is located in the direction of travel of the combine harvester behind the chaff distributor or the trough. It runs in a direction transversely to the direction of travel of the combine harvester. By means of the chaff separation plate, it is ensured that the chaff is not blown further beyond the chaff distributor.

Another advantageous embodiment is characterized in that the chaff distributor or the trough can be travelled backwards. It can therefore be moved in the direction of travel of the combine harvester backwards in the direction of a straw-cutting machine possibly existing at the rear end of the combine harvester. Preferably, the chaff distributor can be travelled so far to the back until its front end is in the region of the chaff separation plate pointing upwards. The chaff separation plate pointing upwards then lies in the region of the front side of the chaff distributor. In this way, it is no longer the chaff which is supplied to the chaff distributor, but the long straw which falls down from the sieve shoe or the rear end of the sieve shoe. This is particularly of advantage in the processing of maize. When threshing maize, it is often desirable that the long straw is not cut, but only distributed. To achieve this, the straw-cutting machine usually provided behind the chaff distributor can be covered by a plate, preferably by a swivellable plate. The plate can be disposed in such a way, in particular inclined in such a way, that the long straw is supplied to the chaff distributor. In this way, it is possible to distribute the straw in an energy-saving manner.

In accordance with another advantageous embodiment, the chaff distributor or the trough possesses in its external regions one opening each in its bottom. Preferably, said openings are located at the ends of the chaff distributor or trough. The chaff conveyed to the ends of the chaff distributor or trough falls downwards through the openings or holes.

Preferably, one blower each is provided in the external regions of the chaff distributor or trough. This is preferably a radial-flow blower. The blowers are preferably disposed below the described openings in the end regions of the chaff distributor or trough. The chaff falling through the openings or holes is distributed evenly by the blowers. The radial-flow blowers can possess vertically running rotor axes.

In accordance with another advantageous embodiment, one directional throw blower each is provided in the external regions of the chaff distributor or trough. These can be radial-flow blowers. The directional throw blowers can possess horizontally running rotor axes. The rotor axes of the directional throw blowers are preferably flush with the axis of the chaff distributor or the axis of rotation of the conveyor screw.

It is advantageous if the blowers or directional throw blowers are journalled. In this way, the angle of throw can be changed in a simple manner. Another advantageous embodiment is characterized in that at the blower ejector, that is at the ejector of the blower or directional throw blower, one or more impellers and/or guide plates and/or fingers are provided. The impellers or guide plates or fingers are preferably adjustable. By the measures mentioned (journalling of the blowers or directional throw blowers and/or preferably adjustable impellers, etc.), a uniform scattering pattern and an exact scattering width—relative to the relevant cutter bar width—can be achieved. It is possible by the measures mentioned to have an effect on the direction of ejection and on the angle of radiation and quantity of the chaff which leaves the blowers or directional throw blowers in the corresponding angle region.

In accordance with another advantageous embodiment, a disposition can be provided in which the directional throw blowers convey the chaff into one further blower each which is preferably mounted on a straw-cutting machine and which preferably blows the chaff into the distribution shoe of the straw-cutting machine.

Furthermore, a disposition can be provided in which the directional throw blowers are provided with one chaff channel each. The chaff channel can blow the chaff into the straw hood so that it is distributed over the straw-cutting machine. The chaff channel can, however, also be disposed in such a way that the chaff is blown into the external region of the straw-cutting machine distributor shoe so that the chaff is distributed in this way.

Another advantageous embodiment is characterized in that one screw conveyor each is provided in the external regions of the chaff distributor or trough. The screw conveyor can be disposed in such a way that is conveys the chaff into the straw hood of the combine harvester. In accordance with another advantageous embodiment, one further blower each exists at the ends of the screw conveyors.

The object forming the basis of the invention is further solved in a chaff distributor for a combine harvester or similar for the distribution of chaff in that behind the chaff distributor a chaff separation plate pointing upwards is provided and that the chaff distributor can be travelled backwards. By means of the chaff separation plate, it is ensured in the manner already described above that the chaff is not blown further beyond the chaff distributor. The chaff separation plate runs essentially vertically and in a direction transversely to the direction of travel of the combine harvester. The chaff distributor can be travelled backwards in the direction of travel of the combine harvester, that is in the direction of a straw-cutting machine possibly existing behind the chaff distributor. This disposition is, in the manner already described above, particularly of advantage in the processing of maize. Reference is made to the corresponding descriptions above.

The invention relates further to a combine harvester which is characterized in accordance with the invention by a chaff distributor in accordance with the invention. Preferably, the combine harvester possesses a straw-cutting machine. The straw-cutting machine can be coverable, preferably by a plate, preferably by a swivellable plate. This is particularly of advantage if a chaff separation plate pointing upwards exists and if the chaff distributor is travellable backwards in the direction of travel of the combine harvester. Then the chaff distributor can be used in a simple and advantageous manner for the distribution of long straw, which is particularly advantageous in the processing of maize. The straw-cutting machine is covered by the preferably swivellable plate so that the long straw falling down from the rear end of the straw-walker is distributed by the chaff distributor.

Further blowers can be provided on the straw-cutting machine.

Another advantageous embodiment is characterized in that the chaff distributor possesses a blower or directional throw blower having a chaff channel pointing into the straw hood of the combine harvester or into the external region of the straw-cutting machine distributor shoe. The chaff distributor can possess a screw conveyor which conveys the chaff into the straw hood of the combine harvester.

BRIEF DESCRIPTION OF THE DRAWINGS

Embodiments of the invention are described in detail below by means of the attached drawing in which.

DESCRIPTION OF THE PREFERRED EMBODIMENTS

Figure 1:
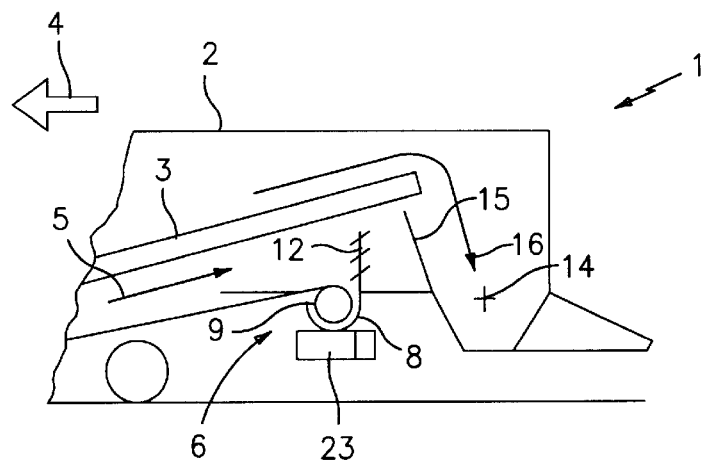
FIG. 1 shows a chaff distributor at the rear end of a combine harvester in a side view.
Figure 2:
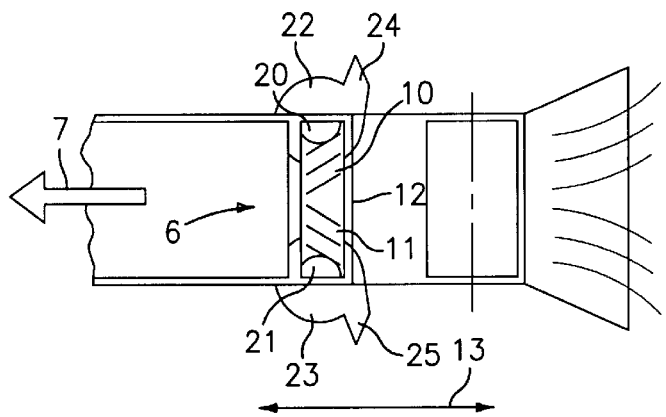
FIG. 2 shows the chaff distributor of FIG. 1 in a top view.

In FIGS. 1 and 2, the rear end of a combine harvester 1 is shown in whose housing 2 a straw-walker (not shown in the drawing) is provided under which a sieve shoe 3 is located. The sieve shoe 3 runs in the direction of travel 4 of the combine harvester 1 slightly inclined from the bottom front to the top back.

The chaff falling through the sieve (cleaning sieve) 3 is blown backwards by the cleaning wind of the combine harvester indicated by the arrow 5. In the region of the rear end of the sieve 3, there is located underneath said sieve 3 the chaff distributor 6 which consists of an essentially semi-cylindrically shaped trough 8 open to the top and running transversely to the longitudinal direction 7 of the combine harvester and of a conveyor screw 9 drivably supported therein. The conveyor screw 9 has, in the manner visible from FIG. 2, a clockwise motion on one side 10 and on another side 11 a counter-clockwise motion. It is driven in such a way that the chaff is conveyed outwardly in each case.

In the direction of travel 4 of the combine harvester 1 behind the chaff distributor 6, an essentially vertical chaff separation plate 12 pointing upwards and running transversely to the longitudinal direction 7 of the combine harvester is provided by means of which it is ensured that the chaff is not blown further beyond the chaff distributor 6. The chaff separation plate. ends below the bottom side of the rear region of the sieve 3. In the position of the chaff distributor 6 shown in FIG. 1, the chaff separation plate 12 follows on tangentially from the rear end of the trough 8.

Figure 3:
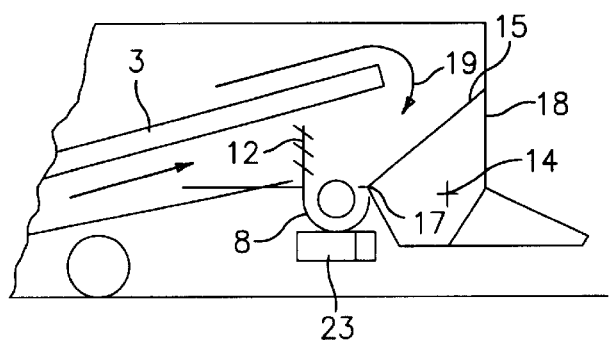
FIG. 3 shows the embodiment of FIG. 1 having a chaff distributor travelled backwards in a side view.
Figure 4:
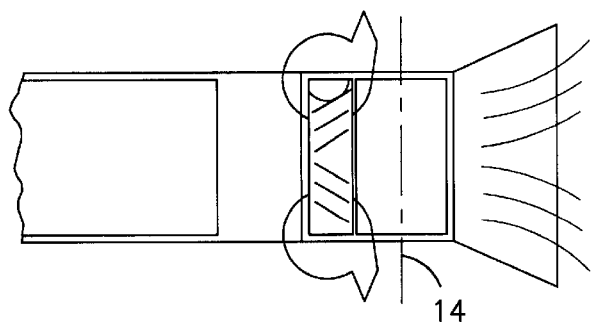
FIG. 4 shows the embodiment of FIG. 3 in a top view.

The chaff distributor 6 can be travelled backwards in the direction of the double arrow 13 in the direction of travel 7 of the combine harvester until it assumes the position shown in FIG. 3 in which it is no longer—as shown in FIG. 1—located in front of the chaff separation plate 12, but behind it and in such a way that the chaff separation plate 12 follows on tangentially from the rear end of the trough 8. The disposition shown in FIG. 3 is particularly advantageous in the processing of maize. In the region of the drawing-in opening of the straw-cutting machine rotatable around a horizontal axis 14 running transversely to the direction of travel 7 of the combine harvester, a cover plate 15 is provided which, in FIG. 1, in which the chaff distributor 6 is travelled forwards, is also swivelled forwards so that the long straw can fall over the rear end of the sieve 3 in the direction of the arrow 16 into the straw-cutting machine 14. When the chaff distributor 6 is travelled backwards in the manner visible from FIG. 3, the cover plate 15 is also swivelled backwards around its horizontal axis 17 lying in the region of the drawing-in opening of the straw-cutting machine 14, running transversely to the direction of travel 7 of the combine harvester so that it assumes the position visible from FIG. 3, in which position the upper end of the cover plate 15 abuts the rear wall 18 of the combine harvester. The long straw falling over the rear end of the sieve 3 is in this way deflected in the direction of the arrow 19 and delivered to the chaff distributor 6 which distributes the long straw.

The trough 8 possesses on its outer ends one opening 20, 21 each in its bottom under which one radial-flow blower 22, 23 each is located whose rotor axes each extend vertically. The blowers 22, 23 are journalled around their vertical rotor axes so that the angle of the ejector openings 24, 25 can be changed. The blowers 22, 23 are fixed to the lower side of the trough 8. They move with the trough 8 when this is travelled in the direction of the double arrow 13.

Figure 5:
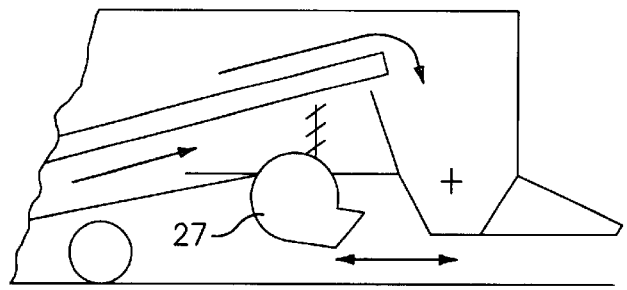
FIG. 5 shows the embodiment of FIG. 1 having a directional throw blower in a side view.
Figure 6:
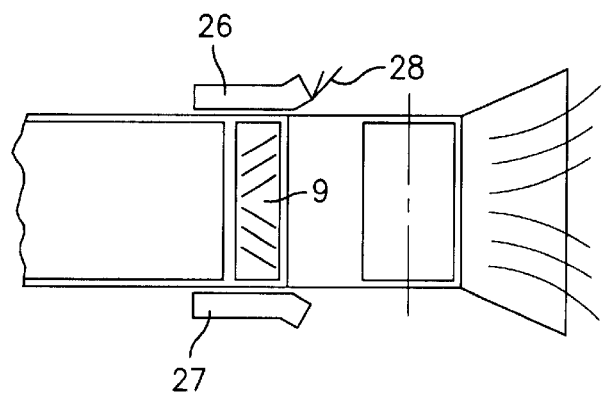
FIG. 6 shows the embodiment of FIG. 5 in a top view.

In the embodiment shown in FIGS. 5 and 6, the chaff is conveyed by the conveyor screw 9 into one directional throw blower 26, 27 each which are located at the outer ends of the chaff distributor. The directional throw blowers 26, 27 are radial-flow blowers whose rotor axes run horizontally and flush with the axis of rotation of the conveyor screw 9. Adjustable guide plates 28 are provided at the ejector openings of the directional throw blowers 26, 27.

Figure 7:
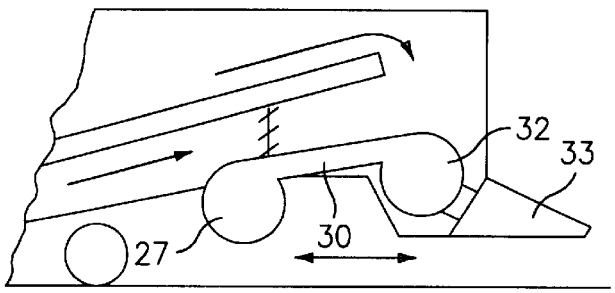
FIG. 7 shows the embodiment of FIG. 5 having another blower in a side view.
Figure 8:
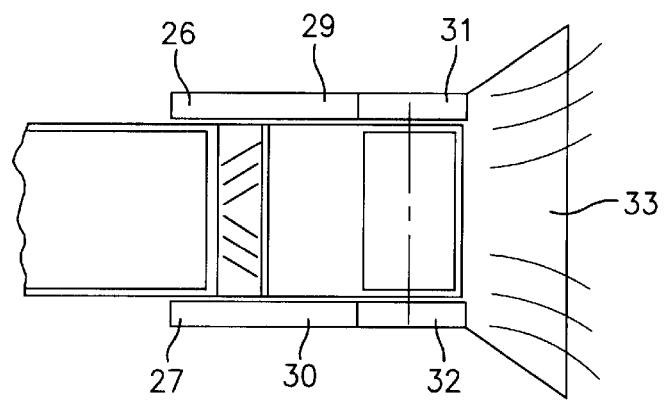
FIG. 8 shows the embodiment of FIG. 7 in a top view.

In the embodiment shown in FIGS. 7 and 8, the directional throw blowers 26, 27 are connected via one chaff channel 29, 30 each to one other blower 31, 32 each. The chaff is conveyed by the directional throw blowers 26, 27 via the chaff channels 29, 30 to the further blowers 31, 32 which then convey the chaff into the corresponding external regions of the straw-cutting machine distributor shoe 33.

Figure 9:
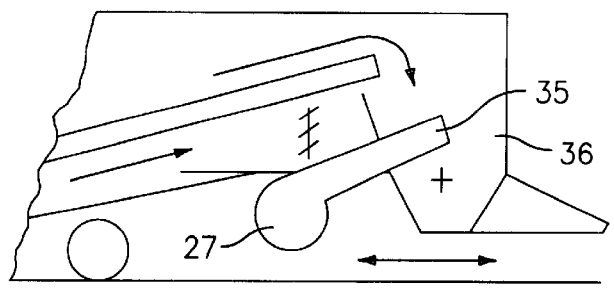
FIG. 9 shows an embodiment having a directional throw blower, which is provided with a chaff channel pointing into the straw hood of the combine harvester, in a side view.
Figure 10:
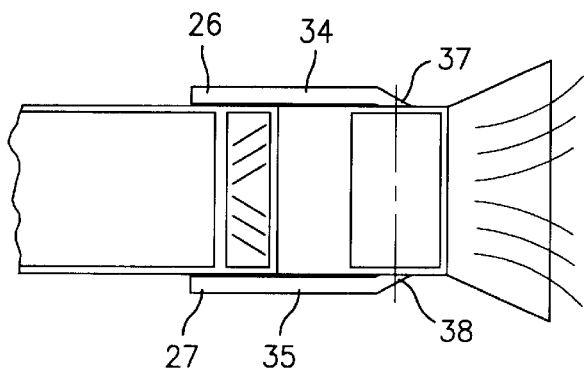
FIG. 10 shows the embodiment of FIG. 9 in a top view.

In the embodiment of FIGS. 9 and 10, the directional throw blowers 26 and 27 are provided with one chaff channel 34, 35 each which open into the straw hood 36 of the combine harvester. The chaff channels 34, 35 first run away from the directional throw blowers 26 and 27 parallel to the direction of travel of the combine harvester. They are bent in an inward direction at their ends 37, 38.

Figure 11:
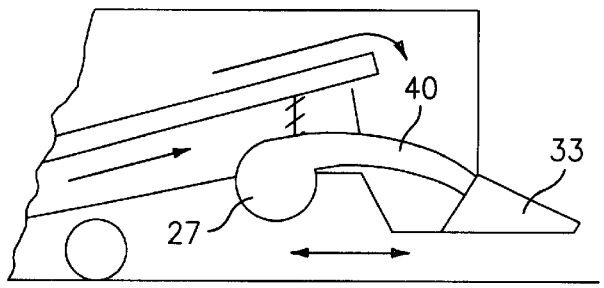
FIG. 11 shows an embodiment having a directional throw blower, which is provided with a chaff channel pointing into the external region of the straw-cutting machine distributor shoe, in a side view.
Figure 12:
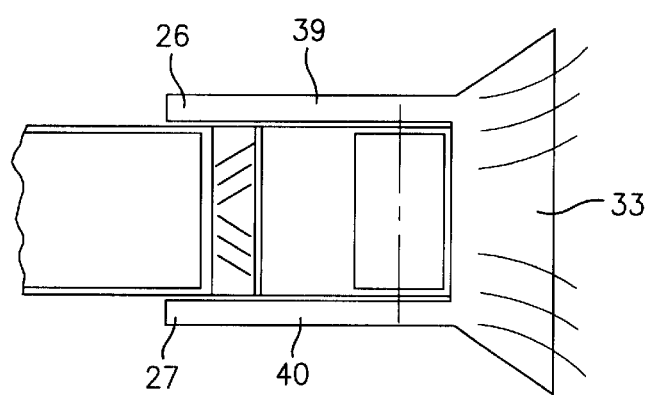
FIG. 12 shows the embodiment of FIG. 11 in a top view.

In the embodiment of FIGS. 11 and 12, the directional throw blowers 26, 27 are provided with chaff channels 39, 40 which convey the chaff into the corresponding external regions of the straw-cutting distribution shoe 33.

Figure 13:
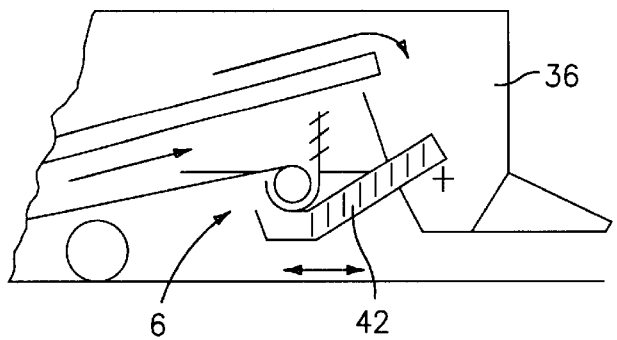
FIG. 13 shows an embodiment having a screw conveyor in a side view.
Figure 14:
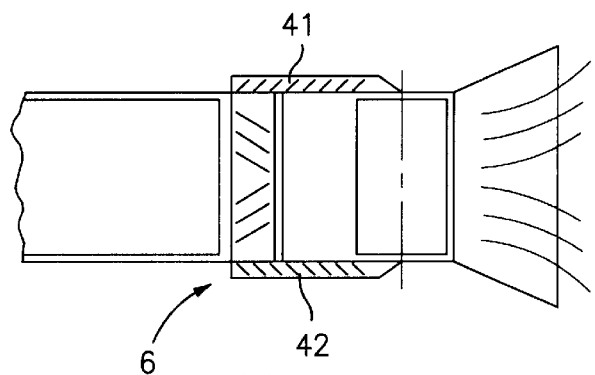
FIG. 14 shows the embodiment of FIG. 13 in a top view.

In the embodiment of FIGS. 13 and 14, on both sides of the chaff distributor 6 one screw conveyor 41, 42 each are provided whose front lower ends are each located under the trough of the chaff distributor and which convey the chaff into the straw hood 36 of the combine harvester.

Figure 15:
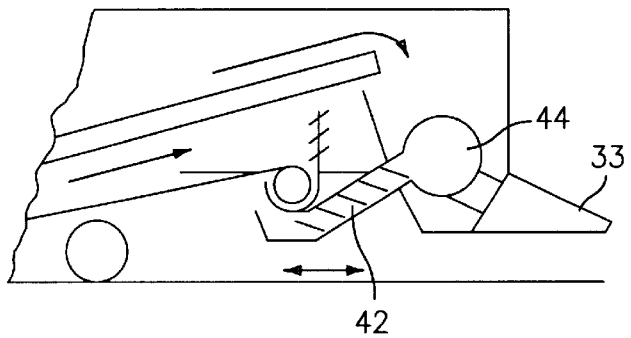
FIG. 15 shows an embodiment having a screw conveyor and a further blower in a side view.
Figure 16:
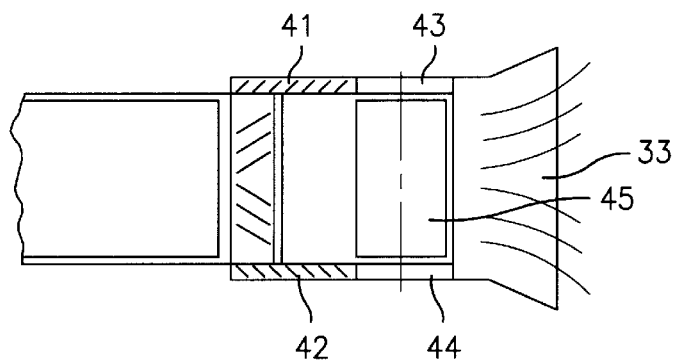
FIG. 16 shows the embodiment of FIG. 15 in a top view.

In the modification of FIGS. 15 and 16, the screw conveyors 41, 42 convey the chaff into one further blower 43, 44 each which are disposed on the sides of the straw-cutting machine 45 and whose horizontal axes of rotation are flush with the axis of rotation of the straw-cutting machine. The further blowers 43, 44 convey the chaff into the external regions of the straw-cutting machine distributor shoe 33.

What is claimed is:

1. A chaff distributor for a combine harvester for the distribution of chaff, wherein a trough (8) having a conveyor screw (9) drivably supported therein are provided, the conveyor screw (9) comprising a clockwise thread along one side (10) thereof and a counter-clockwise thread (11) along an opposite side thereof, such that the conveyor screw (9), upon rotation, has a clockwise motion on the one side (10) and a counter-clockwise motion on the opposite side (11) thereof, and chaff is transported by the conveyor screw (9) into external regions of the trough (8) outwardly, a chaff separation plate (12) pointing upwardly is provided behind the chaff distributor (6) or the trough (8) such that the chaff separation plate (12) extends upwardly and tangentially from a rear end of the trough (8), the chaff distributor (6) or the trough (8) can be moved backwardly and forwardly in a direction of travel of the combine harvester, such that the chaff separation plate (12) is locatable either in front of the chaff distributor (6) or trough (8), or behind the chaff distributor (6) or the trough (8) in the direction of travel of the combine harvester, additionally comprising a sieve shoe (3) runs in a direction of travel (4) of the combine harvester (1) and slightly inclined from a bottom front end to a top back end thereof, said sieve shoe (3) being arranged such that chaff falling through said sieve shoe (3) is blown backwardly by a cooling wind (5) of the combine harvester (1), said chaff separator plate (12) extending close to a lower side and a rear end of said sieve shoe (3), and in one operative position, said chaff distributor trough (8) being movable to position a front end thereof in a region of said chaff separation plate (12) pointing upwardly such that said chaff separation plate (12) extends upwardly and tangentially from a front end of said trough (8), and long straw of maize falling over the rear end of said sieve shoe (3) is deflected into said chaff distributor trough (8) which distributes the long straw, and when said chaff separator trough (8) is in a forward operative position such that said chaff separator plate (12) extends upwardly and tangentially from the rear end of said trough (8), only chaff and not the long straw is supplied to said chaff distributor (6).

2. A chaff distributor in accordance with claim 1, wherein the chaff distributor (6) or the trough (8) possess one opening (20,21) each in their floors in external regions thereof.

3. A chaff distributor in accordance with claim 1, wherein in external regions of the chaff distributor (6) or the trough (8), one blower (22, 23) each is provided.

4. A chaff distributor in accordance with claim 3, wherein on the blower ejector, one or more impellers and/or guide plates (28) and/or fingers are provided.

5. A chaff distributor in accordance with claim 4, wherein the impellers and/or guide plates (28) and/or fingers can be adjusted.

6. A chaff distributor in accordance with claim 1, wherein in external regions of the chaff distributor (6) or the trough (8), one directional throw blower (26,27) each is provided.

7. A chaff distributor in accordance with claim 6, wherein the directional throw blowers (26, 27) convey to one other blower (31, 32) each.

8. A chaff distributor in accordance with claim 6, wherein the directional throw blowers (26, 27) are provided with chaff channel (29, 30; 34, 35; 39, 40).

9. A chaff distributor in accordance with claim 3, wherein the blowers (22,23) are journalled.

10. A chaff distributor in accordance with claim 2, wherein in external regions of the chaff distributor (6) or of the trough (8) one screw conveyor (41, 42) each is provided.

11. A chaff distributor (6) in accordance with claim 1, additionally comprising a straw-cutting machine (14, 45) disposed rearwardly and below the rear end of said sieve shoe (3) with respect to the direction of travel (4) of the combine harvester (1), and a cover plate (15) arranged in a drawing-in region of the straw-cutting machine (14, 45) and rotatable about a horizontal axis (17) running transversely to the direction of travel (4) of the combine harvester (1), said plate (15) being swivellable between two operative positions, a first operative position in which said plate (15) is swivelled forwardly such that when said chaff distributor (6) is moved to the forward operating position thereof, long straw can fall over the rear end of the sieve (3) and into the straw-cutting machine (14, 45) to be cut, and a second operative position in which said cover plate (15) is swivelled rearwardly to cover said cutting machine (14, 45) and said distributor (6) is moved rearwardly, long straw can fall directly into said chaff distributor (6) and be distributed from the combine harvester (1) without being cut.

12. A chaff distributor in accordance with claim 11, additionally comprising one further blower (43, 44) each at the ends of the screw conveyor (41, 42).

13. A combine harvester comprising a chaff distributor in accordance with claim 1.

14. A combine harvester in accordance with claim 13, additionally comprising a straw-cutting machine (14, 45).

15. A combine harvester in accordance with claim 14, wherein the straw-cutting machine can be covered.

16. A combine harvester in accordance with claim 15, wherein the straw-cutting machine can be covered by a plate.

17. A combine harvester in accordance with claim 16, wherein the plate is swivellable plate.

18. A combine harvester in accordance with claim 14, wherein blowers are provided on the straw-cutting machine.

19. A combine harvester in accordance with claim 13, wherein the chaff distributor (6) possesses a blower (22, 23) or a directional throw blower (26, 27) having a chaff channel (34, 35; 39,40) pointing into a straw hood (36) of the combine harvester or into an external region of a straw-cutting machine distributor shoe (33).

20. A combine harvester in accordance with claim 13, wherein the chaff distributor possesses a screw conveyor (41, 42) which conveys the chaff into a straw hood (36) of the combine harvester or to further blowers (43, 44).

21. A chaff distributor for a combine harvester for the distribution of chaff, wherein a trough (8) having a conveyor screw (9) drivably supported therein are provided, the conveyor screw (9) comprising a clockwise thread along one side (10) thereof and a counter-clockwise thread (11) along an opposite side thereof, such that the conveyor screw (9), upon rotation, has a clockwise motion on the one side (10) and a counter-clockwise motion on the opposite side (11) thereof, and chaff is transported by the conveyor screw (9) into external regions of the trough (8) outwardly, a chaff separation plate (12) pointing upwardly is provided behind the chaff distributor (6) or the trough (8) such that the chaff separation plate (12) extends upwardly and tangentially from a rear end of the trough (8), the chaff distributor (6) or the trough (8) can move backwardly and forwardly in a direction of travel of the combine harvester, such that the chaff separation plate (12) is locatable either in front of the chaff distributor (6) or trough (8), or behind the chaff distributor (6) or trough (8) in the direction of the travel of the combine harvester, the chaff distributor(6) comprising the trough (8) and conveyor screw (9) is directly attached behind a cleaning system or sieve shoe (3) of the combine harvester, said sieve shoe (3) runs in a direction of travel (4) of the combine harvester (1) and is slightly inclined from a bottom front end to a top back end thereof, said shoe (3) being arranged such that chaff falling through said sieve shoe (3) is blown backwardly by a cooling wind (5) of the combine harvester (1), said chaff separator plate (12) extending close to a lower side and a rear end of said sieve shoe (3), and in one operative position, said chaff distributor trough (8) being movable to position a front end thereof in a region of said chaff separation plate (12) pointing upwardly such that said chaff separation plate (12) extends upwardly and tangentially from a front end of said trough (8), and long straw of maize falling over the rear end of said sieve shoe (3) is deflected into said chaff distributor trough (8) which distributes the long straw, and when said chaff separator trough (8) is in a forward operative position such that said chaff separator plate (12) extends upwardly and tangentially from the rear end of said trough (8), only chaff and not the long straw is supplied to said chaff distributor (6).

22. A chaff distributor (6) in accordance with claim 21, additionally comprising a straw-cutting machine (14, 45) disposed rearwardly and below the rear end of said sieve shoe (3) with respect to the direction of travel (4) of the combine harvester (1), and a cover plate (15) arranged in a drawing-in region of the straw-cutting machine (14, 45) and rotatable about a horizontal axis (17) running transversely to the direction of travel (4) of the combine harvester (1), said plate (15) being swivellable between two operative positions, a first operative position in which said plate (15) is swivelled forwardly such that when said chaff distributor (6) is moved to the forward operating position thereof, long straw can fall over the rear end of the sieve (3) and into the straw-culting machine (14, 45) to be cut, and a second operative position in which said cover plate (15) is swivelled rearwardly to cover said cutting machine (14, 45) and said distributor (6) is moved rearwardly, long straw can fall directly into said chaff distributor (6) and be distributed from the combine harvester (1) without being cut.

23. A chaff distributor for a combine harvester for the distribution of chaff, wherein a trough (8) having a conveyor screw (9) drivably supported therein are provided, the conveyor screw (9) comprising a clockwise thread along one side (10) thereof and a counter-clockwise thread (11) along an opposite side thereof, such that the conveyor screw (9), upon rotation, has a clockwise motion on the one side (10) and a counter-clockwise motion on the opposite side (11) thereof, and chaff is transported by the conveyor screw (9) into external regions of the trough (8) outwardly, a chaff separation plate (12) pointing upwardly is provided behind the chaff distributor (6) or the trough (8) such that the chaff separation plate (12) extends upwardly and tangentially from a rear end of the trough (8), the chaff distributor (6) or the trough (8) can move backwardly and forwardly in a direction of travel of the combine harvester, such that the chaff separation plate (12) is locatable either in front of the chaff distributor (6) or trough (8), or behind the chaff distributor (6) or trough (8), in the direction of the travel of the combine harvester, the screw conveyor (9) and trough (8) are both positioned below the chaff separation plate (12) in a vertical direction, additionally comprising a sieve shoe (3) running in a direction of travel (4) of the combine harvester (1) and slightly inclined from a bottom front end to a top back end thereof, said shoe (3) being arranged such that chaff falling through said sieve shoe (3) is blown backwardly by a cooling wind (5) of the combine harvester (1), said chaff separator plate (12) extending close to a lower side and a rear end of said sieve shoe (3), and in one operative position, said chaff distributor trough (8) being movable to position a front end thereof in a region of said chaff separation plate (12) pointing upwardly such that said chaff separation plate (12) extends upwardly and tangentially from a front end of said trough (8), and long straw of maize falling over the rear end of said sieve shoe (3) is deflected into said chaff distributor trough (8) which distributes the long straw, and when said chaff separator trough (8) is in a forward operative position such that said chaff separator plate (12) extends upwardly and tangentially from the rear end of said trough (8), only chaff and not the long straw is supplied to said chaff distributor (6).

24. A chaff distributor (6) in accordance with claim 22, additionally comprising a straw-cutting machine (14, 45) disposed rearwardly and below the rear end of said sieve shoe (3) with respect to the direction of travel (4) of the combine harvester (1), and a cover plate (15) arranged in a drawing-in region of the straw-cutting machine (14, 45) and rotatable about a horizontal axis (17) running transversely to the direction of travel (4) of the combine harvester (1), said plate (15) being swivellable between two operative positions, a first operative position in which said plate (15) is swivelled forwardly such that when said chaff distributor (6) is moved to the forward operating position thereof, long straw can fall over the rear end of the sieve (3) and into the straw-cutting machine (14, 45) to be cut, and a second operative position in which said cover plate (15) is swivelled rearwardly to cover said cutting machine (14, 45) and said distributor (6) is moved rearwardly, long straw can fall directly into said chaff distributor (6) and be distributed from the combine harvester (1) without being cut.

* * * * *